(12) United States Patent
Chen et al.

(10) Patent No.: US 7,415,014 B2
(45) Date of Patent: *Aug. 19, 2008

(54) METHOD AND SYSTEM FOR CO-RELATING TRANSPORT PACKETS ON DIFFERENT CHANNELS USING A PACKET PRIORITIZATION SCHEME

(75) Inventors: Iue-Shuenn Chen, San Diego, CA (US); Rajesh Mamidwar, San Diego, CA (US); Francis Cheung, Del Mar, CA (US); Xuemin (Sherman) Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 981 days.

This patent is subject to a terminal disclaimer.

(21) Appl. No.: 10/392,468

(22) Filed: Mar. 19, 2003

(65) Prior Publication Data

US 2004/0042459 A1  Mar. 4, 2004

Related U.S. Application Data

(60) Provisional application No. 60/406,707, filed on Aug. 29, 2002.

(51) Int. Cl.
*H04L 12/28* (2006.01)
*H04J 3/04* (2006.01)
*H04H 20/28* (2008.01)

(52) U.S. Cl. .............. 370/390; 370/395.42; 370/535; 370/487

(58) Field of Classification Search ............... 370/390, 370/389, 393, 394, 395.42, 395.43, 392, 370/535, 536, 538, 230, 235, 395.1, 487, 370/485, 486, 432, 473
See application file for complete search history.

(56) References Cited

U.S. PATENT DOCUMENTS

| | | | |
|---|---|---|---|
| 6,724,761 B1 * | 4/2004 | Moy-Yee et al. | 370/390 |
| 7,127,619 B2 * | 10/2006 | Unger et al. | 713/193 |
| 7,151,831 B2 * | 12/2006 | Candelore et al. | 380/200 |
| 7,218,610 B2 * | 5/2007 | Sivakumar et al. | 370/230 |

* cited by examiner

*Primary Examiner*—Hanh Nguyen
(74) *Attorney, Agent, or Firm*—McAndrews, Held & Malloy, Ltd.

(57) ABSTRACT

Aspects of the invention include assigning a priority to a primary packet for a particular channel and replicating the primary packet to create a secondary packet for the particular channel. A primary packet may be selected in order to co-relate the primary packet to a legacy system. Similarly, a secondary packet may be selected in order to co-relate the secondary packet to a new system. The priority assigned to the primary packet may uniquely distinguish the primary packet from a priority of the other packets for the particular channel. The primary packet and the secondary packet may have the same priority and the same continuity counter.

30 Claims, 5 Drawing Sheets

METHOD AND SYSTEM FOR CO-RELATING TRANSPORT PACKETS ON DIFFERENT CHANNELS USING A PACKET PRIORITIZATION SCHEME

RELATED APPLICATIONS

This application makes reference to, claims priority to and claims the benefit of U.S. Provisional Patent Application Ser. No. 60/406,707 filed on Aug. 29, 2002.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present application relate generally to the MPEG packet transport, and more particularly to a system and method for corelating MPEG transport packets.

The introduction of broadband networks, access devices such as set-top boxes, and media such as DVD disks recorded with digitally compressed audio, video and data signals, for example, which utilize motion Picture Expert Group (MPEG) compression protocols, may provide sound and picture quality that is virtually indistinguishable from the original material. The One of the commonly-used MPEG protocols called MPEG-2, provides the necessary protocols and infrastructure that may be used for transferring digitally compressed audio, video and data signals. A detailed description of the MPEG 2 standard is published as ISO/IEC Standard 13818. As broadband networks continue to evolve, there is a need to provide access for legacy devices to ensure interoperability with legacy and disparate systems.

An MPEG program may contain a plurality of data streams. These may include the elementary stream (ES), a packetized elementary stream (PES), a transport stream (TS) and a program specific information stream. An MPEG encoder typically creates the ESs by utilizing one or more analog video and audio content. The MPEG encoder may be configured to apply MPEG compression algorithms to the source content, which may result in an individual compressed ES for each audio and video stream. This encoded and compressed data stream may be decoded in a set-top box and viewed on a TV. Factors such as a bit rate of the encoded stream, quality of the original source content and encoder algorithm may typically determine the quality of the output signal. Notably, the type of encoding may determine whether another system will be able to decode and interpret a received MPEG data stream. In this regard, the other system may be a legacy or disparate system.

In a typical MPEG data stream, the length of individual ESs may be equivalent to the length of the program. Each ES may be contained in a plurality of variable-length packets called a PES. The PES may include a header that may precede one or more payload bytes. The header may include information pertaining to the encoding process required by the MPEG decoder to decompress and decode a received ES. Each individual ES may have a corresponding PES and any encoded audio and video information may still reside in separate PESs. Notably, the PES may be viewed primarily as a logical construct and is not intended to be utilized for data interchange, transport, and interoperability. Notwithstanding, the PES may be utilized for conversion between transport streams (TSs) and program information streams (PSs).

The TS and PS may be formed by multiplexing a plurality of PES packets. The TS may include a plurality of additional packets that may contain tables, which may be necessary for de-multiplexing the TS. The tables may be collectively called program specific information (PSI). To maintain synchronization and timing, null packets may also be inserted to fill the intervals between information-bearing packets. Timing information for an associated program may be carried by specific packets. One type of timing information may be called the program clock reference (PCR). The PCR may be located in one of the optional header fields of the TS packet. During operation, the PCR may permit the decoder to synchronize its clock to the same frequency as that of the original encoder's clock frequency. TS packets may have a fixed length of 188 bytes, which may include a header having a minimum size of 4 bytes and a maximum payload of 184 bytes.

Figure 1:
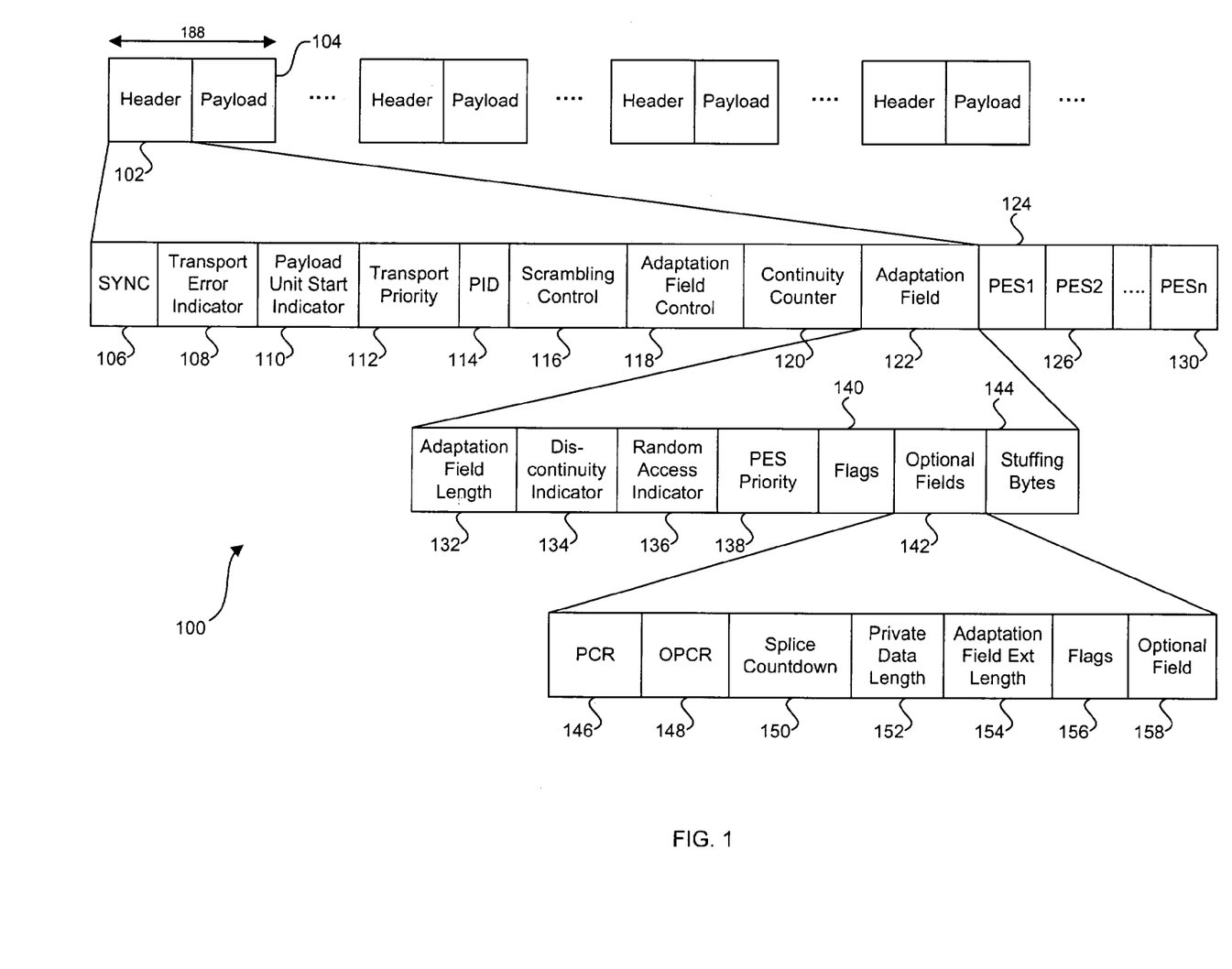
FIG. 1 is a diagram of the structure for an exemplary MPEG transport stream.

FIG. 1 is a diagram of the structure for an exemplary MPEG transport stream 100. Referring to FIG. 1, TS 100 may include a header 102 and payload 104. Header 102 may include the following fields: synchronization (SYNC) 106, transport error indicator 108, payload unit start indicator 110, transport priority 112, packet ID (PID) 114, transport scrambling control 116, adaptation field control 118, continuity counter 120, adaptation field 122, and a plurality of PES, namely PES1 124, PES2 126, . . . , PESn 130. The adaptation field 118 may further include the following fields: adaptation field length 132, discontinuity indicator 134, random access indicator 136, PES priority 138, flags 140, optional fields 142 and stuffing bytes 144. The optional fields 142 may further include the following: program clock reference (PCR) 146, OPCR 148, a splice countdown 150, private data length 152, adaptation field extension length 154, flags 156 and optional field 158.

The TS 100 may include variable length PES that may be divided into fixed length packets for use by a transmission system. In this regard, the information added by the TS is additional to the information contained in the headers of the PESs. SYNC byte 106 may be used to delineate the beginning and ending of TS packet 100. The transport error indicator 108 may indicate when there is an error in a packet or block. This may be particularly useful for error block testing. PID 114 may be a unique identifier that may identify every video and audio stream. Additionally, each PSI table may have a unique PID 114. The PID 114 may be utilized for identifying a channel and may include any information required for locating, identifying and reconstructing programs. Some PIDs are reserved for specific uses by the MPEG protocol. PID values may be stored in PSI tables. In order to ensure that all the audio, video and data for a program are properly decoded, it may be critical to ensure that the PIDs are correctly assigned and that the PSI tables correspond with their associated audio and video streams.

PCR 146 may have 42 bits, 9 bits of which may be incremented at 27 MHz and 33 bits that may be incremented at 90 kHz upon rollover of the 9 bits. The bits in PCR 146 may provide program clock recovery information that may be utilized for synchronization. PCR 146 may be used to provide a clock recovery mechanism for MPEG programs. A 27 MHz system time clock (STC) signal may typically be used for encoding MPEG signals. Decoding of the signal requires a clock that may be locked to the encoder's STC of 27 MHz. Notably, the PCR 146 may be utilized by the decoder to regenerate a local clock signal that is locked to the STC. Whenever a program is placed in the transport stream, a 27

MHz time stamp may be inserted into the PCR 146. When the signal is received by a decoder, the decoder may compare the value in the PCR 146 with the frequency of its local voltage controlled oscillator (VCO) and adjust the VCO to ensure that the VCO is locked to the frequency specified by the PCR 146. To ensure accuracy, the PCR 146 may be updated with the STC every about 100 ms.

The continuity counter (CC) 120 may be used to determine when packets are lost or repeated. It may include a 4-bit field, which may be repeatedly incremented from zero to 15 for each PID. Discontinuity counter 134 may permit a decoder to handle discontinuities in the transport stream. Discontinuity counter 134 may indicate a time base such as the PCR 146 and continuity counter 120 discontinuities. Random access indicator 136 may be configured to indicate whether the next PES packet in the PID stream contains a video-sequence header or the first byte of an audio frame. Splice countdown 150 may be configured to indicate the number packets of the same PID number to a splice point occurring at the start of PES packets.

Two or more MPEG TSs may be multiplexed to form a multi-program TS. In a case where the TC may include a single MPEG TS, the output of the multiplexer may be called a single program TS (SPTS). Furthermore, a number of SPTSs may be multiplexed to create a multi-program TS. In some cases, the program may include one or more ESs that may have a similar time reference. This may occur, for example, in a movie that has video and its corresponding audio content.

PSI may include a set of tables that may be part of a TS. The tables in the PSI may be required while de-multiplexing the TS and for matching PIDs to their corresponding programs. Once the PIDs are matched to their corresponding programs, the TS may be decoded by assembling and decompressing program contents. Typically, in order to determine which audio and video PIDs contain the corresponding content for a particular program, a program map table (PMT) may be decoded. Each program may have its own PMT bearing a unique PID value. The PAT may be decoded in order to determine which PID contains the desired program's PMT. The PAT may function as the master PSI table with PID value which may always be equal to zero(0). In a case where the PAT cannot be found and decoded in the TS, no programs may be available for presentation.

The PSI table may be refreshed periodically at a rate that is fast enough to allow a set-top box to go through program recovery and decompression processes. This may be necessary to ensure real-time user interaction. The PSI may also be used to determine the accuracy and consistency of PSI contents. Notwithstanding, during programs changes or modification of multiplexer provisioning, there may be packets which have a PID value present in the TS, but have no corresponding reference in the PSI. Additionally, the PSI may have references to one or more packets in the PID that are not present in the TS.

In existing MPEG compliant systems, audio/video services may be carried using some or all of the 188 bytes of the packet, called transport packets. Multiple services may be differentiated using a packet identifier (PID) contained in a packet header called the transport packet header. Transport packets from various services may be multiplexed and transmitted on the same physical medium. Exemplary media may include, copper, coaxial cable, wireless, optical and any combination thereof. On the receiver side transport packets may be demultiplexed and data may be separated for each service. For example, audio packets may be separately de-multiplexed from video packets.

Transport packets may include three fields, namely a 4-byte header, an optional adaptation field and a packet payload. The packet payload may not be altered by multiplexing or transmitting equipment, except during processing which may include data encryption and decryption. In generally, encryption may be done once within a typical MPEG processing system. Notwithstanding, some fields of adaptation field may be changed by multiplexing and transmission equipment. Typically, packet order within a PID channel may be maintained from an MPEG encoder to an MPEG receiver but packet order among multiple PID streams may not guaranteed by during transmission by any transmitting equipment. In cases where co-relation of packets from different PIDs may be required, packet position in a stream cannot be utilized since packet order among multiple PID channels may be altered.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention provide a method and system for co-relating transport packets on different channels having different PIDs for compatibility with a new system and a legacy system. The method may include the steps of assigning a priority to a primary packet for a particular channel and replicating the primary packet to create a secondary packet for the particular channel. The primary packet and the secondary packet may be communicated via a transport media. The primary packet and the secondary packet may have a same priority and continuity counter values for a particular channel.

In response to the receipt of an incoming transport stream, a primary packet may be selected in order to co-relate the primary packet to a legacy system. Similarly, in response to the receipt of an incoming transport stream, a secondary packet may be selected in order to co-relate the secondary packet to a new system. In this regard, a secondary or a primary packet may be selected based on whether a system that receives the incoming transport stream is a new system or a legacy system. The priority assigned to the primary packet may uniquely distinguish the primary packet from a priority of other packets for the particular channel.

The selecting step may further include the step of receiving the primary packet for the particular channel by the new system and decoding the received primary packet by a decoder provided by the new system. The selecting step may further include the step of receiving the secondary packet by the legacy system and decoding the selected secondary packet by a decoder provided by the legacy system. A primary packet PID corresponding to the primary packet may be selected if the receiving system is the legacy system. Additionally, the a secondary packet PID corresponding to the secondary packet may be selected if the receiving system is the new system.

In another embodiment of the invention, a machine-readable storage, having stored thereon a computer program having at least one code section executable by a machine for causing the machine to perform the steps for co-relating transport packets on different channels having different PIDs for compatibility with a new system and a legacy system as described above may be provided.

In another embodiment, a system for co-relating transport packets on different channels having different PIDs for compatibility with a new system and a legacy system may be provided. The system may include means for assigning a priority to a primary packet for a particular channel and means for replicating the primary packet to create a secondary packet for the particular channel. Means for communicating the primary packet and the secondary packet via a transport media may be provided. The primary packet and the secondary packet may have a similar priority and continuity counter values for a particular channel. The invention also provides means for selecting the primary packet in order to co-relate the selected primary packet and means for selecting the secondary packet in order to co-relate the selected secondary packet with the new system. In this regard, a secondary or a primary packet may be selected based on whether a system that receives the incoming transport stream is a new system or a legacy system. The selecting means may be responsive to the receipt of an incoming transport stream. The priority assigned to the primary packet may uniquely distinguish the primary packet from a priority of other packets for the particular channel.

The selecting means may further include means for receiving the primary packet for the particular channel by the new system and means for decoding the received primary packet by a decoder provided by the new system. The selecting means may further include means for receiving the secondary packet by the legacy system and means for decoding the selected secondary packet by a decoder provided by the legacy system. The selecting means may further include means for selecting a primary packet PID corresponding to the primary packet if the receiving system is the legacy system. The invention may also include means for selecting a secondary packet PID corresponding to the secondary packet if the receiving system is the new system.

The invention may further include a system for co-relating transport packets on different channels having different PIDs for compatibility with a new system and a legacy system. The system may include an assignment processor for assigning a priority to a primary packet for a particular channel. A replicating processor may be configured to replicate the primary packet and create a secondary packet for the particular channel. The replicating processor and the assignment processor may be embodied within the same processor although the invention in not limited in this regard. At least one communicator may be provided to communicate the primary packet and the secondary packet via a transport media.

The primary packet and the secondary packet may have a same priority and continuity counter for a particular channel. In response to the receipt of an incoming transport stream, a selector may be configured to select a primary packet in order to co-relate the selected primary packet to the legacy system. The selector may also be configured to select a secondary packet in order to corelate the selected primary packet to the new system. In this regard, a secondary or a primary packet may be selected by the selector based on whether a system that receives the incoming transport stream is a new system or a legacy system. The priority assigned by the assignment processor to the primary packet may uniquely distinguish the primary packet from a priority of other packets for the particular channel. The primary packets and the secondary packets may have a similar priority and a similar continuity counter for a particular channel.

The selector may further include a receiver for receiving the primary packet for the particular channel by the new system and a decoder for decoding the received primary packet by a decoder provided by the new system. The selector may further include a receiver for receiving the secondary packet by the legacy system and a decoder for decoding the selected secondary packet by a decoder provided by the legacy system. The selector may also be configured to select a primary packet PID corresponding to the primary packet if the receiving system is the legacy system. Additionally, the selector may select a secondary packet PID corresponding to the secondary packet if the receiving system is the new system.

These and other advantages, aspects and novel features of the present invention, as well as details of an illustrated embodiment thereof, will be more fully understood from the following description and drawings.

DETAILED DESCRIPTION OF THE INVENTION

Figure 1A:
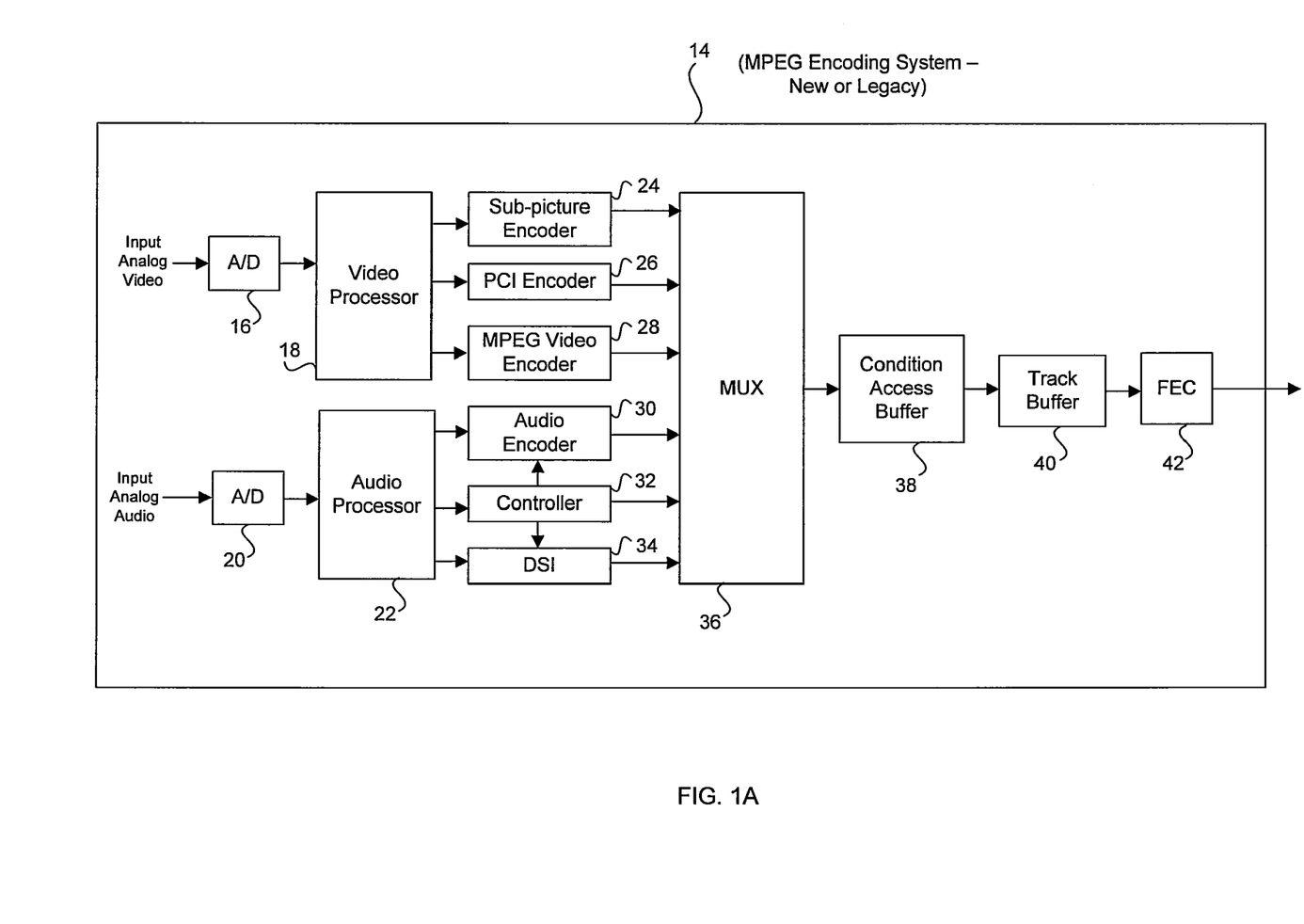
FIG. 1A is a block diagram of an exemplary MPEG encoding system.

FIG. 1A is a block diagram of an exemplary MPEG encoding system 14, in accordance with an embodiment of the invention. The MPEG encoding system 14 may be an embodiment of an MPEG encoding legacy system ("legacy system") and/or an embodiment of a new MPEG encoding system ("new system"), whereby the MPEG encoding system 14 may comprise suitable logic, circuitry and/or code to enable encoding of MPEG signals according to a legacy system format and/or a new system format. Referring to FIG. 1A, an analog input signal may be converted to digital format by A/D converter 16. An output signal from the A/D converter 16 may be communicated to video processor 18 for processing. After the video processor 18 processes the signal, the output signal generated from the video processor 18 may be sent to a sub-picture encoder 24 for processing. A presentation control information (PCI) encoder 26 may be configured to encode PCI data for the video signal processed by video processor 18. The output signal generated from the video processor 18 may also be received and processed by an MPEG video encoder 28 which may be configured to format the video signal in MPEG format.

An analog input audio signal may be converted to digital format by A/D converter 20. An output signal from the A/D converter 20 may be communicated to audio processor 22 for processing. After the audio processor 22 processes the signal, the output signal generated from the audio processor 22 may be sent to an audio encoder 30 to be encoded in a suitable format. A data search information (DSI) encoder 34 may be configured to encode indexing and search data for the video signal processed by audio processor 22. The outputs from the sub-picture encoder 24, PCI encoder 26, MPEG video encoder 28, audio encoder 30 and DSI encoder 34 may be multiplexed into a single data stream, by multiplexer 36. A controller 32 may be configured to control the operations of audio encoder 30, DSI encoder 34 and multiplexer (MUX) 36. The output of the MUX 36 may include a single steam, which may contain various kinds of PES. The PES may include, audio, video, PCI, DSI and sub-picture information.

Figure 1B:
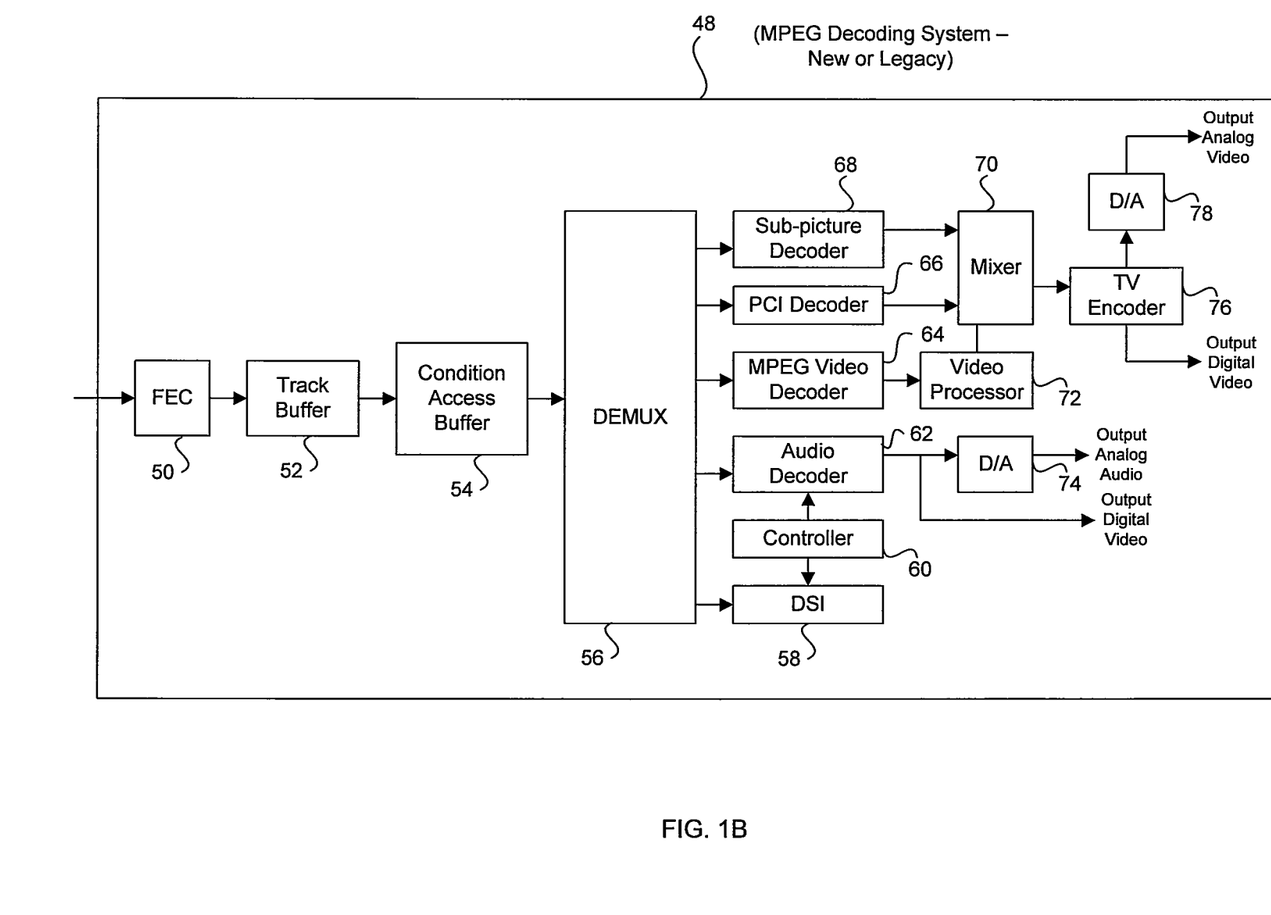
FIG. 1B is a block diagram of an exemplary MPEG decoding system.

The MPEG encoding system 14 may also include a conditional access buffer 38 that may be configured to controls propagation of the packets through MUX 36. A track buffer 40 may be used to buffer and assemble data packets for further processing. Finally, the assembled packets may be encoded with a forward error correction algorithm within the forward error correction block (FEC) 42 for transmission over a channel. The output of the FEC block 42 may be an MPEG formatted digital audio/video signal. FIG. 1B is a block diagram of an exemplary MPEG decoding system 48, in accordance with an embodiment of the invention. The MPEG decoding system 48 may be an embodiment of an MPEG decoding legacy system ("legacy system") and/or an embodiment of a new MPEG decoding system ("new system"). whereby the MPEG decoding system 48 may comprise suitable logic, circuitry and/or code to enable encoding of MPEG signals according to a legacy system format and/or a new system format. MPEG decoding system 48 may be, for example, a set-top box. Referring to FIG. 1B, MPEG decoding system 48 may include a forward error correction processing block 50 and a track buffer 52. The track buffer 52 may be used to buffer and assemble data packets for further processing. The packets may be processed by a conditional access circuit 54 that may be configured to control propagation of the packets through de-multiplexer (DEMUX) 56 and into respective video and audio processing paths. The output of the DEMUX 56 may include various kinds of packetized elementary streams (PES), including audio, video, presentation control information (PCI), sub-picture information, and data search information (DSI) streams. The de-multiplexed PCI in the PES may be buffered prior to being decoded by PCI decoder 66.

The sub-picture information in the PES may be buffered and decoded by sub-picture decoder 68. The de-multiplexed video stream in the PES may be decoded by MPEG video decoder 64. Video processor 72 may be configured to process the output from the MPEG video decoder 64. Video processor 72 may be a microprocessor or an integrated circuit (IC). Subsequent to processing of the MPEG video, mixer 70 may combine the outputs of the PCI decoder 66, the video processor 64 and the sub-picture decoder 68 to form a composite video signal. The output of mixer 70 may thereafter be encoded in a conventional television signal format such as PAL, SECAM, or NTSC by the TV encoder 76. The output of the TV encoder 76 may be a digital video signal. However, D/A converter 78 may convert this digital video output signal to an analog video output signal.

The audio portion of the PES may be buffered and decoded by audio decoder 62. The output of the audio decoder 62 may be a digital audio signal. The audio D/A 74 may process digital audio received from the audio decoder 62 and produce an analog audio output signal. Audio decoder 62 may include a frame buffer sufficient for temporarily storing audio frames prior to decoding. Controller 60 may control the operation of audio decoder 62 and DSI 58. Controller 60 may be configured to utilize DMA to access to data in track buffer 52 or any other associated memory (not shown).

Figure 2:
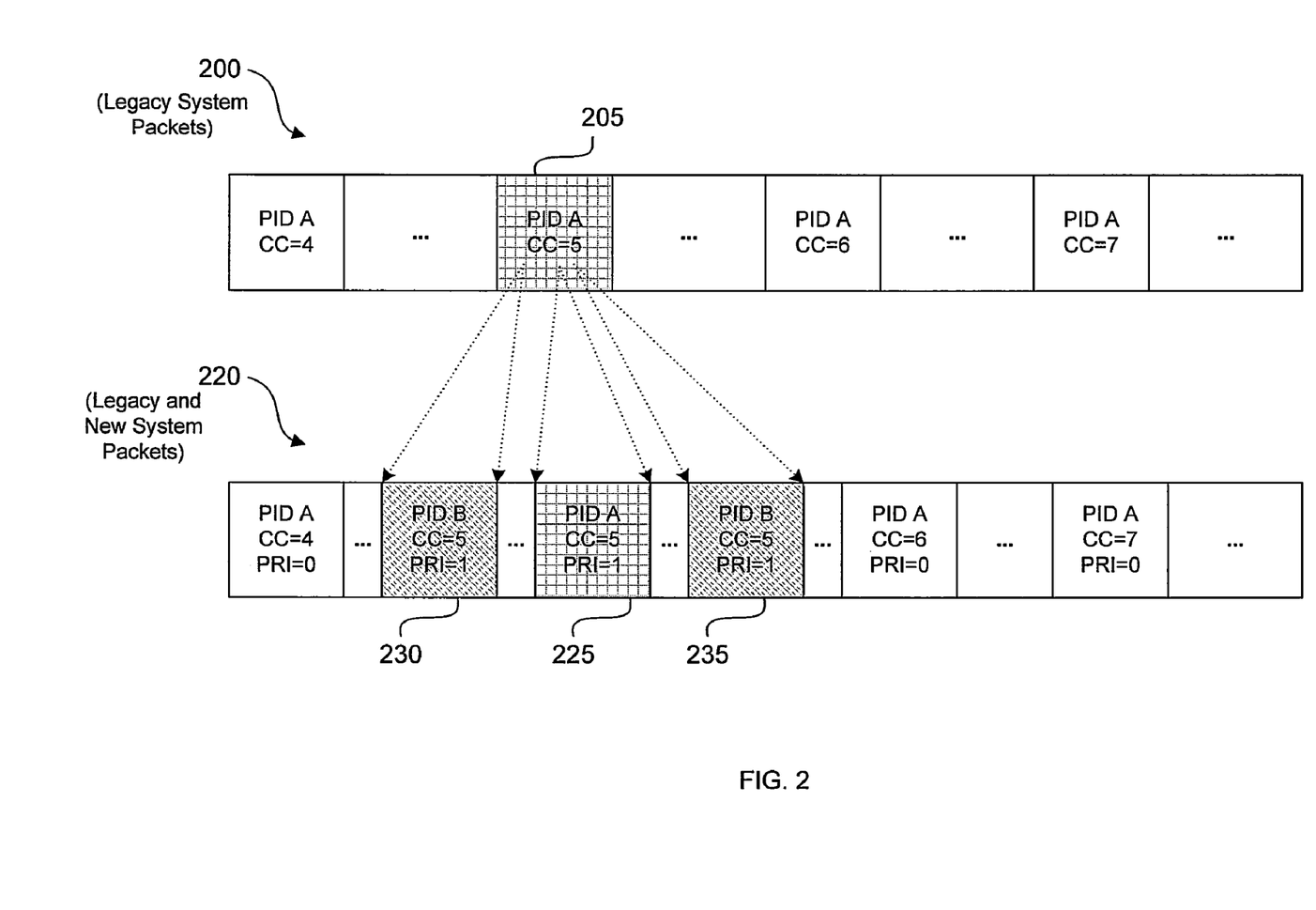
FIG. 2 is an exemplary transport system arrangement in accordance with an embodiment of the present invention.

FIG. 2 is an exemplary transport system arrangement in accordance with an embodiment of the present invention. Referring to FIG. 2, there is shown an original TS 200 and an incoming transport stream 220. The original TS 200 may include a plurality of packets for one or more programs. The packets identified in TS 200 may belong to a program for a particular legacy system. In this regard, PID A may identify the packets as corresponding to that legacy system. A continuity counter field (CC) for the packets identified may be incremented by one, thereby signifying that the packets may be in sequence and no packets for the program are missing from that portion of TS 200. Packet 205 in TS 200 may be identified as a critical packet. Packet 205 may have a continuity counter of CC=5.

Incoming transport stream 220 is an exemplary TS that may be created in accordance with one embodiment of the invention. Incoming transport stream 220 may include a plurality of packets for one or more programs. Notably, the incoming transport stream 220 may include all the packets identified in TS 200 and additional packets that may belong to the same program corresponding to the packets of TS 200. The additional packets may include packets 230 or 235. Importantly, the additional packets in the incoming transport stream 220 may be intended for a new system rather than the legacy system, which corresponds to the identified packets in TS 200. In this regard, the additional packets, which may be intended for the new system, may be identified with PID B. The PID A packets for the legacy system may be called primary packets and the PID B packets may be called secondary packets. Although both secondary packets 230 and 235 are shown in incoming transport stream 220, either of secondary packet 230 or 235 may be in incoming transport stream 220. Accordingly, the additional secondary packet may either precede or succeed the primary or critical packet 225.

In order to generate a corresponding secondary packet such as 230 or 235, for incoming transport stream 220 from a primary packet 205 in the original stream 200, a packet priority (PRI) may be assigned to the primary packet. For example, a PRI field of packet 225 may be set to 1 or any other arbitrary assignment. PRI for the secondary packet may be set to a value that differs from a default value used for other packets in the incoming transport stream 220. For example, the default value used for the other packets of incoming transport stream 220 is "0". This value may be arbitrarily chosen. Packet 225 may subsequently be replicated to create the secondary packet, which may have PID A. During creation of the secondary packet, the assigned PRI and the contents of the CC field of the primary packet may be equal to the secondary packet.

Figure 3:
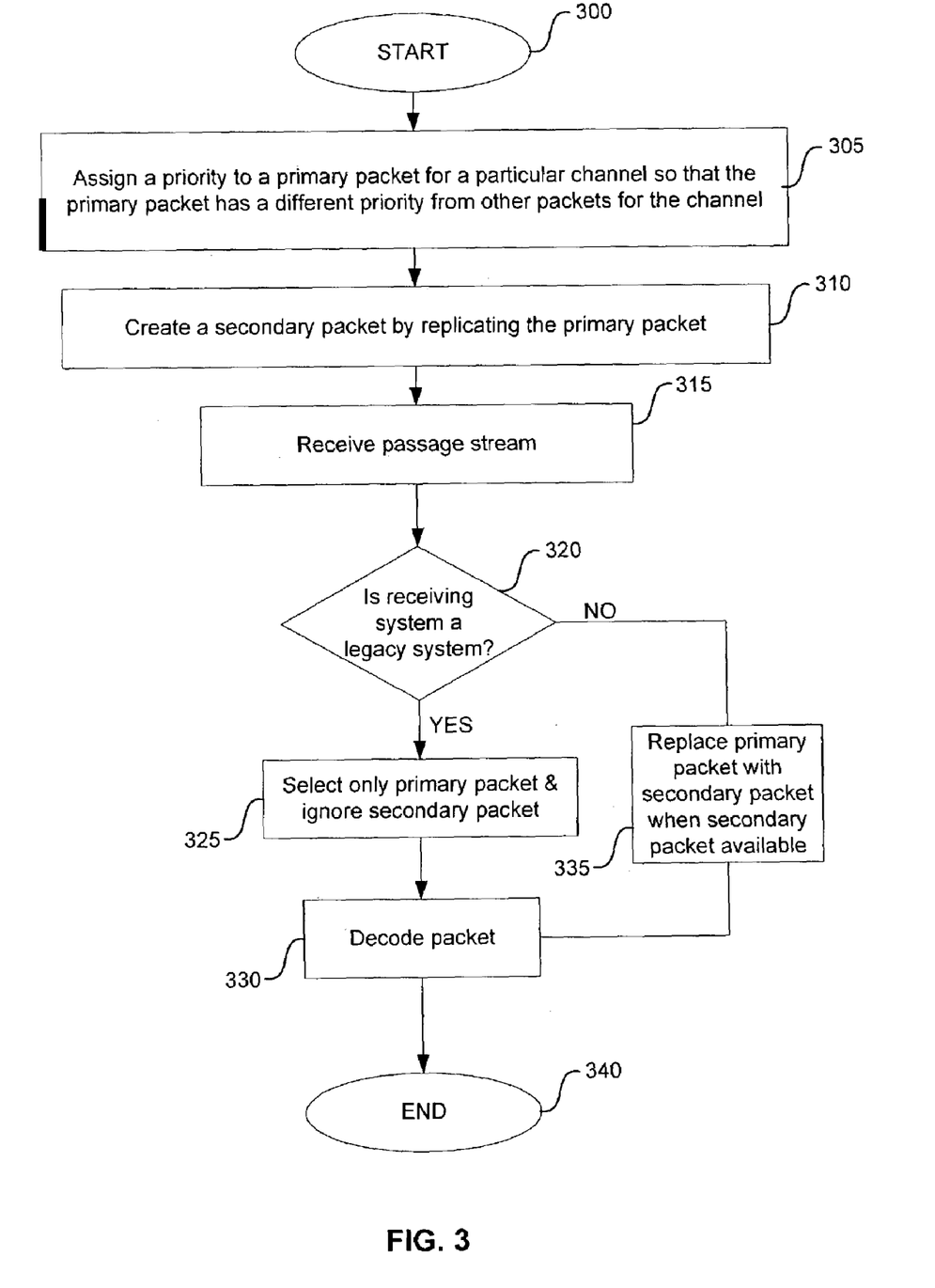
FIG. 3 is a flowchart illustrating exemplary steps for co-relating packets in accordance with an embodiment of the present invention.

FIG. 3 is a flowchart illustrating exemplary steps for co-relating packets in accordance with an embodiment of the present invention. Referring to FIG. 3, the flowchart starts at step 300. Subsequently, in step 305, a priority may be assigned to a primary packet for a particular channel so that the primary packet has a priority that differs from other packets for the channel. In this regard, the priority of the other packets may be a default priority assigned to those other packets, although the invention is not so limited. The primary packet may be a critical packet.

In step 310, a secondary packet may be created by replicating the primary or critical packet. In step 315, an incoming transport stream having the primary and secondary packets may be received at a receiver. The receiver may be a device such as, an MPEG decoder or set-top box. In step 320, a decision may be made as to whether a receiving system receiving the incoming transport stream is a legacy system. If the receiving system is a legacy system, then in step 325, the primary packet may be selected. Subsequently, in step 330, the primary packet may be decoded. Returning to step 320, if the receiving system is a not a legacy system, then in step 335, the primary packet may be replaced with a secondary packet when a secondary packet is available. The secondary packet may be decoded in step 330. The steps may end at 340.

Advantageously, there is no need to modify any local transport buffer models that may have been previously established for the legacy system. In addition, there is no dependency on packet ordering since replication of the packets preserves the original ordering.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

The invention claimed is:

1. A method for processing a plurality of transport packets on different channels, the method comprising:
    assigning a priority indicator to a primary packet for a particular channel, said primary packet selected from the plurality of transport packets on different channels, and the plurality of transport packets comprising different packet identifiers (PIDs) for compatibility with a new system and a legacy system;
    generating a secondary packet for said particular channel by replicating said primary packet, wherein said secondary packet is assigned said priority indicator, and wherein said primary packet is compatible with said legacy system and said secondary packet is compatible with said new system; and
    communicating said primary packet and said secondary packet via a transport media.

2. The method according to claim 1, whereas in response to receipt of an incoming transport stream, selecting one of said primary packet and said secondary packet for said particular channel based on whether a system that receives said incoming transport stream via said transport media is said new system or said legacy system.

3. The method according to claim 2, wherein said priority indicator assigned to said primary packet uniquely distinguishes said primary packet from one or more of a priority indicator of other packets for said particular channel, said primary packet, and said secondary packet having same priority indicator and same continuity counter values for said particular channel.

4. The method according to claim 3, wherein said selecting step comprises:
    receiving said primary packet for said particular channel by the new system; and
    decoding said received primary packet by a decoder provided by the new system.

5. The method according to claim 3, wherein said selecting step comprises:
    receiving said secondary packet by the legacy system; and
    decoding said selected secondary packet by a decoder provided by the legacy system.

6. The method according to claim 1, wherein said selecting comprises:
    selecting a primary packet PID corresponding to said primary packet if said receiving system is the legacy system; and
    selecting a secondary packet PID corresponding to said secondary packet if said receiving system is the new system.

7. The method according to claim 1, comprising:
    assigning a continuity counter to said primary packet.

8. The method according to claim 7, wherein said secondary packet comprises said continuity counter.

9. A machine-readable storage, having stored thereon a computer program having at least one code section executable by a machine for causing the machine to perform the steps comprising:
    assigning a priority indicator to a primary packet for a particular channel for processing a plurality of transport packets on different channels having different packet identifiers (PIDs) for compatibility with a new system and a legacy system;
    generating a secondary packet for said particular channel by replicating said primary packet, wherein said secondary packet is assigned said priority indicator, and wherein said primary packet is compatible with said legacy system and said secondary packet is compatible with said new system; and
    communicating said primary packet and said secondary packet via a transport media.

10. The machine-readable storage according to claim 9, comprising selecting one of said primary packet and said secondary packet for said particular channel based on whether a system that receives an incoming transport stream via said transport media is said new system or said legacy system.

11. The machine-readable storage according to claim 10, wherein said priority indicator assigned to said primary packet uniquely distinguishes said primary packet from one or more of a priority indicator of other packets for said particular channel, said primary packet, and said secondary packet having same priority indicator and same continuity counter values for said particular channels.

12. The machine-readable storage according to claim 11, wherein said selecting code section comprises code for:
    receiving said primary packet for said particular channel by the new system; and
    decoding said received primary packet by a decoder provided by the new system.

13. The machine-readable storage according to claim 11, wherein said selecting code section comprises code for:
    receiving said secondary packet by the legacy system; and
    decoding said selected secondary packet by a decoder provided by the legacy system.

14. The machine-readable storage according to claim 11, wherein said selecting code section comprises code for:

selecting a primary packet PID corresponding to said primary packet if said receiving system is the legacy system; and selecting a secondary packet PID corresponding to said secondary packet if said receiving system is the new system.

15. The system according to claim 14, wherein said priority indicator assigned to said primary packet uniquely distinguishes said primary packet from a priority indicator of one or more of other packets for said particular channel, said primary packet, and said secondary packet having same priority indicator and same continuity counter values for said particular channel.

16. The system according to claim 15, wherein said one or more circuits receives said primary packet for said particular channel at the new system, and said one or more circuits decodes said received primary packet at the new system.

17. The machine-readable storage according to claim 9, comprising:

code for assigning a continuity counter to said primary packet.

18. The machine-readable storage according to claim 17, wherein said secondary packet comprises said continuity counter.

19. A system for processing a plurality of transport packets on different channels, the system comprising:

one or more circuits that assigns a priority indicator to a primary packet for a particular channel, said primary packet selected from the plurality of transport packets on different channels, and the plurality of transport packets comprising different packet identifiers (PIDs) for compatibility with a new system and a legacy system;

said one or more circuits generates a secondary packet for said particular channel by replicating said primary packet, wherein said secondary packet is assigned said priority indicator, and wherein said primary packet is compatible with said legacy system and said secondary packet is compatible with said new system; and said one or more circuits communicates said primary packet and said secondary packet via a transport media.

20. The system according to claim 19, wherein said one or more circuits selects one of said primary packet and said secondary packet for said particular channel based on whether a system that receives an incoming transport stream via said transport media is said new system or said legacy system.

21. The system according to claim 20, wherein said one or more circuits receives said secondary packet at the legacy system, and said one or more circuits decodes said selected secondary packet at the legacy system.

22. The system according to claim 20, wherein said one or more circuits selects a primary packet PID corresponding to said primary packet, if said receiving system is the legacy system, and said one or more circuits selects a secondary packet PID corresponding to said secondary packet, if said receiving system is the new system.

23. The system according to claim 19, wherein said one or more circuits assigns a continuity counter to said primary packet.

24. The system according to claim 23, wherein said secondary packet comprises said continuity counter.

25. A system for processing a plurality of transport packets on different channels, the system comprising:

at least one processor that assigns a priority indicator to a primary packet for a particular channel, said primary packet selected from the plurality of transport packets on different channels, and the plurality of transport packets comprising different packet identifiers (PIDs) for compatibility with a new system and a legacy system;

said at least one processor generates a secondary packet for said particular channel by replicating said primary packet, wherein said secondary packet is assigned said priority indicator, and wherein said primary packet is compatible with said legacy system and said secondary packet is compatible with said new system; and at least one communicator for communicating said primary packet and said secondary packet via a transport media.

26. The system according to claim 25, comprising a selector for selecting one of said primary packet and said secondary packet for said particular channel based on whether a system that receives an incoming transport stream via said transport media is said new system or said legacy system.

27. The system according to claim 26, wherein said priority indicator assigned to said primary packet uniquely distinguishes said primary packet from a priority indicator of one or more of other packets for said particular channel, said primary packet, and said secondary packet having same priority indicator and same continuity counter values for said particular channel.

28. The system according to claim 27, wherein said selector comprises:

a receiver for receiving said secondary packet by the legacy system; and a decoder for decoding said selected secondary packet by a decoder provided by the legacy system.

29. The system according to claim 26, wherein said selector step comprises:

a receiver for receiving said primary packet for said particular channel by the new system; and a decoder for decoding said received primary packet by a decoder provided by the new system.

30. The system according to claim 26, wherein said selector comprises:

a selector for selecting a primary packet PID corresponding to said primary packet if said receiving system is the legacy system; and a selector for selecting a secondary packet PID corresponding to said secondary packet if said receiving system is the new system.

* * * * *